US006053519A

United States Patent [19]

Poindexter et al.

[11] Patent Number: 6,053,519

[45] Date of Patent: Apr. 25, 2000

[54] OCCUPANT OPERATED MOTORIZED VEHICLE WITH LIFT ASSIST

[75] Inventors: Joel T. Poindexter, Independence; Robert A. Eberle, Kansas City, both of Mo.; James L. Gerner, Shawnee, Kans.; Joel D. Poindexter; Edith L. Poindexter, both of Independence, Mo.

[73] Assignee: The Advanced Technologies Corp., Kansas City, Mo.

[21] Appl. No.: 08/969,230

[22] Filed: Nov. 13, 1997

Related U.S. Application Data

[60] Provisional application No. 60/030,691, Nov. 13, 1996.

[51] Int. Cl.[7] .......... B62M 1/14

[52] U.S. Cl. .......... 280/250.1; 180/907; 297/DIG. 10; 5/86.1

[58] Field of Search .......... 180/907; 280/250.1, 280/87.041; 5/611, 83.1, 86.1; 297/DIG. 4, DIG. 10

[56] References Cited

U.S. PATENT DOCUMENTS

| | | | |
|---|---|---|---|
| 4,155,416 | 5/1979 | Ausmus . | |
| 4,390,076 | 6/1983 | Wier et al. | 180/907 |
| 4,437,537 | 3/1984 | Ausmus . | |
| 4,545,085 | 10/1985 | Feldt | 5/86.1 |
| 4,802,542 | 2/1989 | Houston et al. | 180/907 |
| 5,366,036 | 11/1994 | Perry | 180/907 |
| 5,369,821 | 12/1994 | Richards et al. | 5/86.1 |
| 5,490,687 | 2/1996 | Scholl | 5/86.1 |
| 5,520,402 | 5/1996 | Nestor et al. | 280/250.1 |
| 5,618,055 | 4/1997 | Mulholland | 180/907 |
| 5,644,805 | 7/1997 | Horcher | 5/86.1 |
| 5,701,968 | 12/1997 | Wright-Ott et al. | 180/907 |

OTHER PUBLICATIONS

The Advanced Technology Corporation, Moto–Stand™, Product Brochure, dated Mar., 1996.

The Advanced Technology Corp., The Moto–Stand™, Product Brochure, dated May, 1996.

Stand–Aid of Iowa, Inc., Stand–Aid, Product Brochure, date unknown.

The Advanced Technology Corp., Moto–Stand, Product Brochure, date unknown.

*Primary Examiner*—Daniel G. DePumpo
*Attorney, Agent, or Firm*—Shook, Hardy & Bacon LLP

[57] ABSTRACT

An occupant-operated motorized vehicle is provided having a motorized front wheel assembly. The vehicle is further provided with an operator controlled lifting structure which aides the occupant in coming to a standing position. The lifting structure includes a linear actuator that is coupled to a clevis, which is in turn coupled to a shaft. Activation of the actuator causes the clevis and therefore the shaft to rotate. Attached to each end of the shaft is a lift lever that extends rearwardly away from the shaft. The end of the lever not attached to the shaft are equipped to be coupled to a support sling that is used to support the occupant and raise the occupant to a standing position. The vehicle is further equipped with a seat to accommodate the occupant in an initial seated position, and at any time that the occupant desires to be in a seated position. The vehicle of the invention also includes a hip support which is used to support the occupant in a stable, standing position and which may be adjusted vertically to enhance the support and comfort of the occupant.

19 Claims, 4 Drawing Sheets

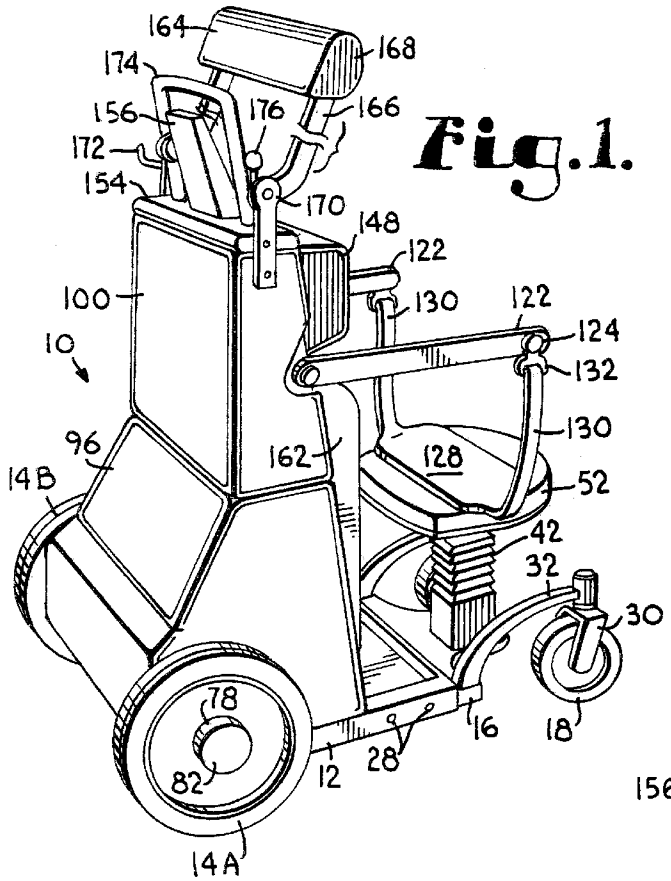
Fig.1.
Fig.3.
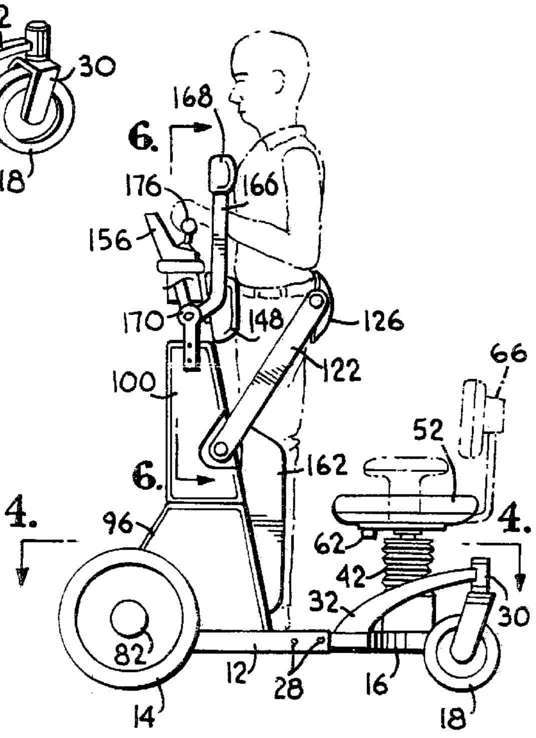
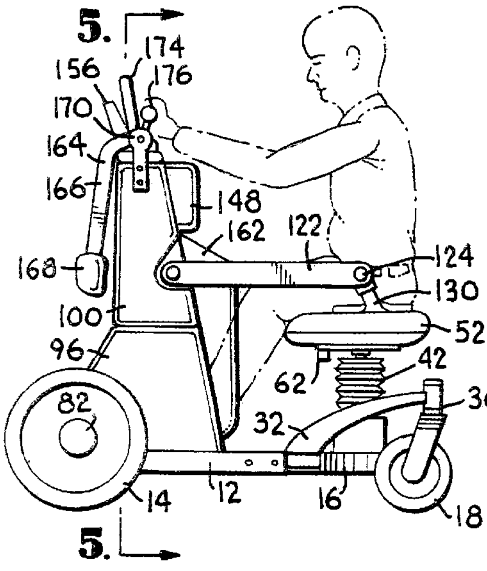
Fig.2.

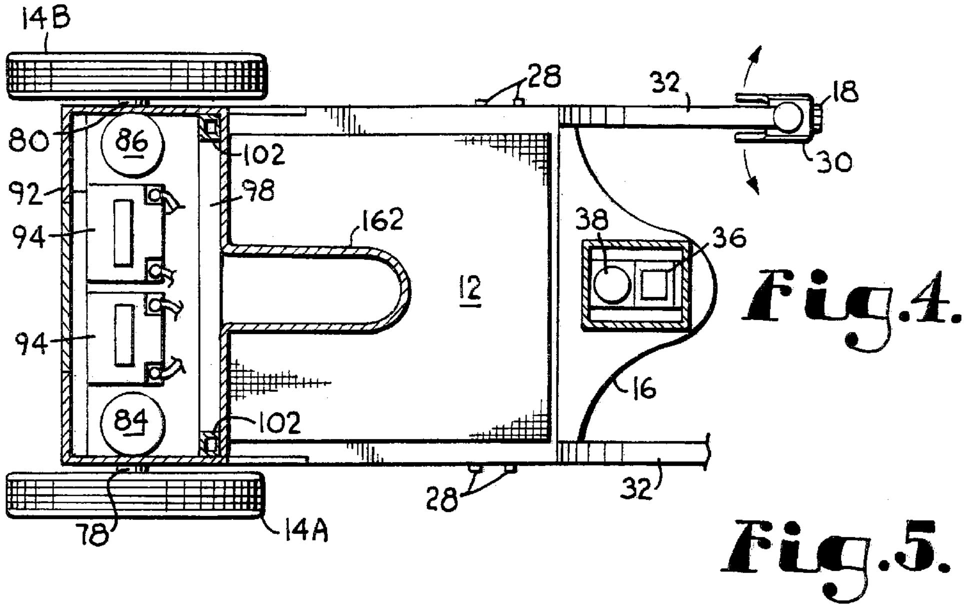
Fig.4.
Fig.5.
Fig.6.
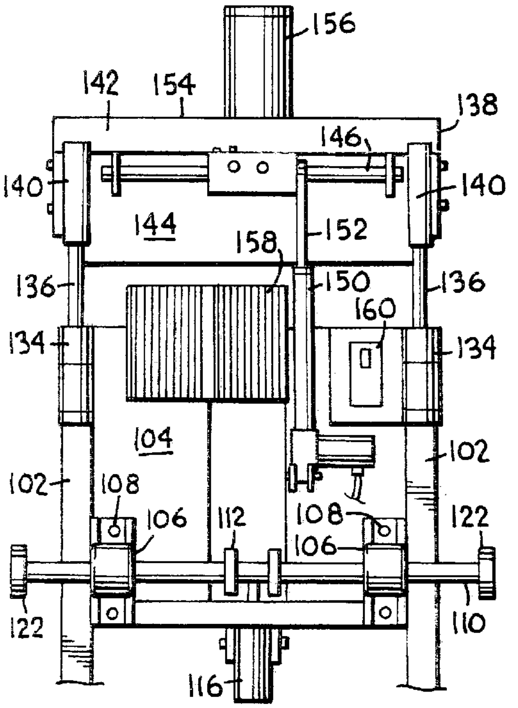
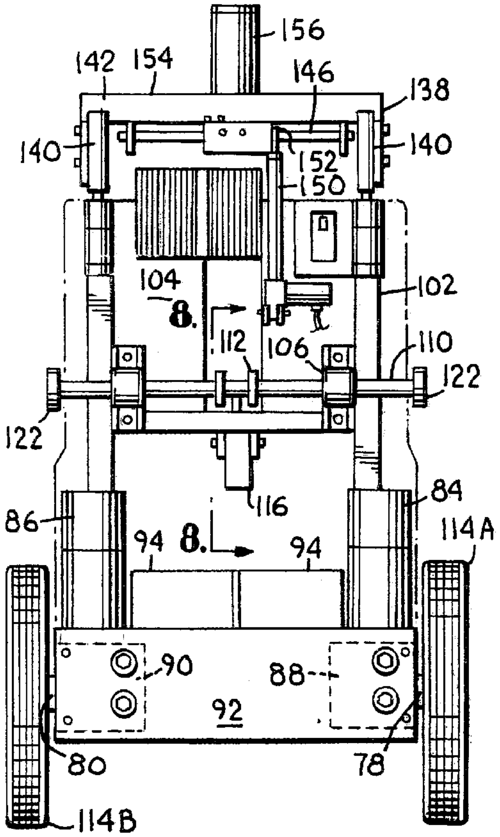

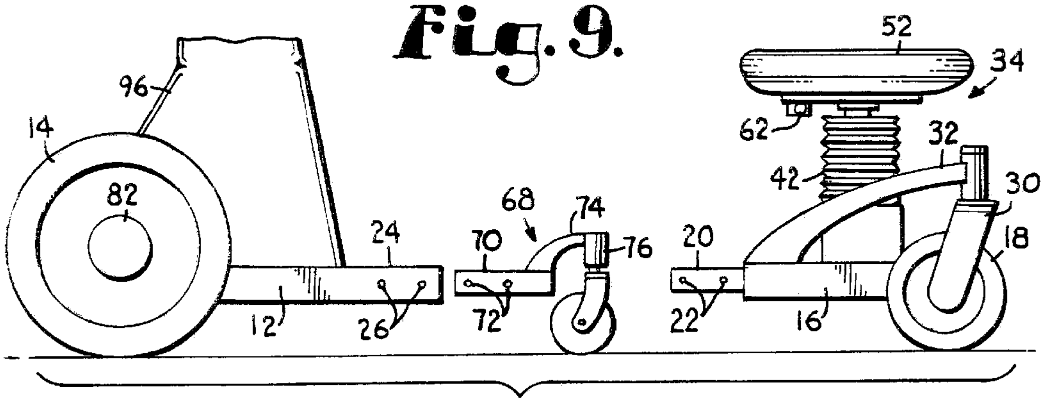
Fig. 9.
Fig. 10.
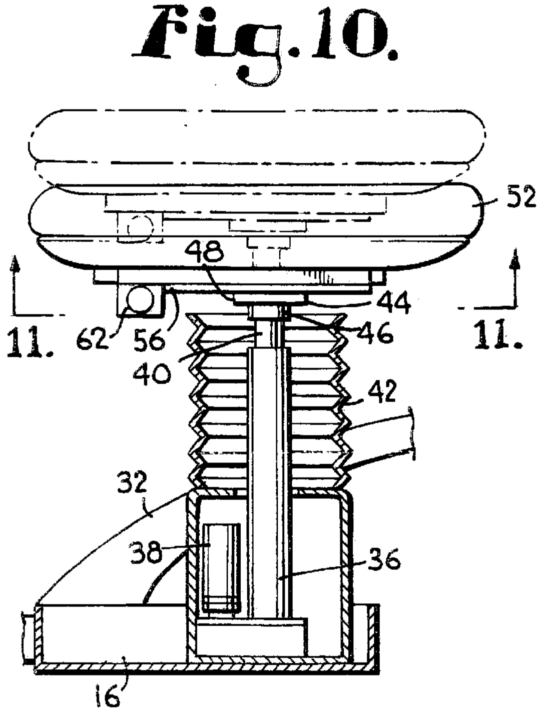
Fig. 11.
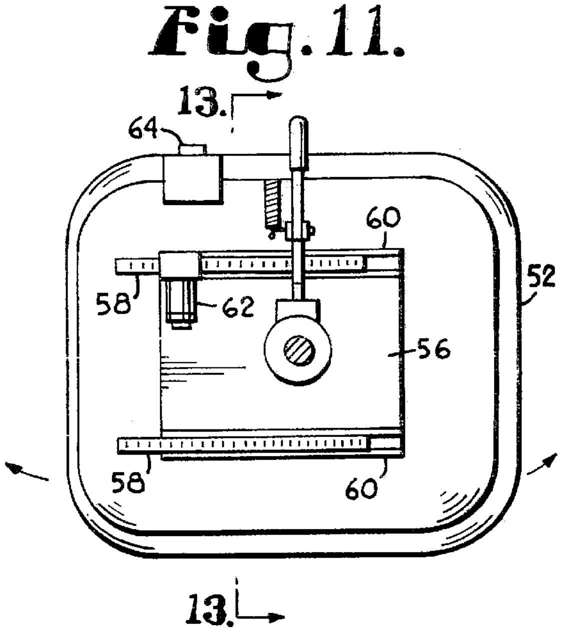
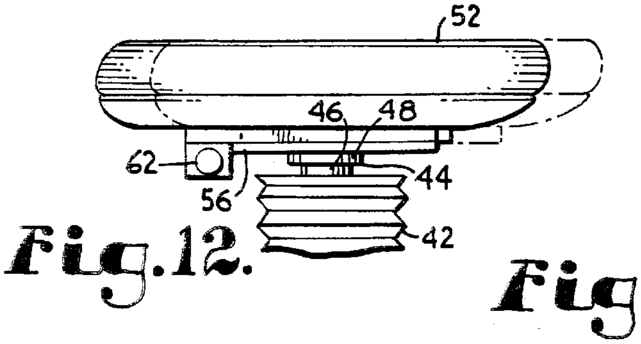
Fig. 12.
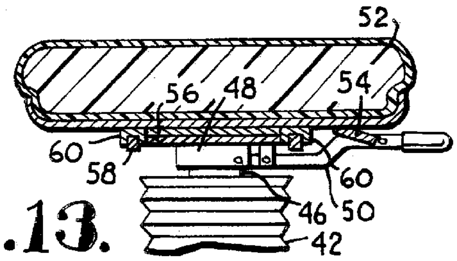
Fig. 13.

OCCUPANT OPERATED MOTORIZED VEHICLE WITH LIFT ASSIST

CROSS-REFERENCE TO RELATED APPLICATION

This application claims the benefit of U.S. Provisional Application No. 60/030,691, filed Nov. 13, 1996.

STATEMENT REGARDING FEDERALLY SPONSORED RESEARCH OR DEVELOPMENT

Not Applicable.

BACKGROUND OF THE INVENTION

This invention relates to a motorized vehicle for supporting and transporting paraplegics and other handicapped persons and, more particularly, to a motorized vehicle for supporting and transporting paraplegics and other handicapped persons that is equipped with a lift assist structure.

Vehicles have been designed for use by individuals physically handicapped in their legs, and particularly paraplegic individuals, that allow the individual user to be supported in a standing position. These vehicles support the occupant's body in a standing posture that allows the occupant to reach a work area with his or her hands. The challenge addressed by these previous vehicles was to provide a vehicle that supported the occupant in a stable, standing position while still maintaining the necessary degree of maneuverability to allow for movement around objects and through doors. One such previous vehicle is disclosed in U.S. Pat. No. 4,155,416. The vehicle disclosed in U.S. Pat. No. 4,155,416 is a motorized, occupant-operated vehicle that supports physically handicapped people in a stable, standing position. The vehicle so disclosed allows the occupant to access work areas in front of the vehicle. Another patent disclosing such a vehicle is U.S. Pat. No. 4,437,537. U.S. Pat. No. 4,437,537 discloses a structure for mounting on a vehicle that allows the vehicle to tilt forwardly, which allows the occupant access to objects and areas on or near the floor on which the vehicle is traveling.

While the vehicles disclosed in the above-mentioned patents do allow a handicapped individual to be supported in a standing position once within the vehicle, the vehicles of the type shown in the patents suffer from a number of disadvantages. The major disadvantage of the above-referenced vehicles is that they are difficult for the occupant to enter. For example, a vehicle of the type generally shown in U.S. Pat. No. 4,155,416 requires the occupant to place his feet on a footplate and thereafter grasp an upper structure of the vehicle and pull himself up to a standing position. Once in the standing position, the occupant can secure a support belt in place to lock himself in position within the vehicle. Therefore, use of such a vehicle requires that the user have sufficient upper body strength to be able to pull himself up to a standing position. If a person does not have this amount of upper body strength, then he or she will require assistance to enter the vehicle.

Another disadvantage associated with the above-referenced vehicles is that they do not provide a structure to allow the occupant to be supported in a seated position. In other words, the occupant using the above-referenced vehicles will always be supported in a standing position. It is often desirable or necessary for the occupant to be supported in a seated position. Further, it is often desirable for the occupant to have the ability to select between a seated and a standing position. The vehicles of the type described above do not provide a structure to support an occupant in a seated position, or a structure which allows the height of a seat structure to be adjusted between a variety of heights to increase the comfort of the occupant and the use to which the vehicle is put.

Yet another disadvantage of the above-discussed vehicles is that the hip support, against which the occupant's hips are rested for support, is not fully adjustable. Depending on the size of the occupant and the task being performed by the occupant, it is often desirable to adjust the hip support to increase the comfort of the user.

Therefore, an occupant-operated motorized vehicle is needed which overcomes the drawbacks and deficiencies of the existing vehicles discussed above.

BRIEF SUMMARY OF THE INVENTION

Accordingly, it is an object of the present invention to provide an occupant-operated motorized vehicle that allows the occupant to be supported in a standing position in which the occupant can enter the vehicle with less effort and less upper-body strength than required by presently available vehicles.

Another object of the invention is to provide an occupant-operated motorized vehicle that allows the occupant to be supported in different postures and positions, such as standing and sitting to enhance the functionality of the vehicle.

A further object of the invention is to provide an occupant-operated motorized vehicle in which the hip support against which the occupant's hips are supported can be adjusted to a number of different heights to further increase the comfort of the user.

A still further object of the invention is to provide an occupant-operated motorized vehicle that can be equipped with a seat for use by the occupant which can be adjusted to a number of different heights so that different sizes of occupants can be accommodated.

According to the present invention, the foregoing and other objects are obtained by an occupant-operated motorized vehicle that is provided with a motorized front wheel assembly. The vehicle is further provided with an operator controlled lifting structure which aides the occupant in coming to a standing position. The lifting structure includes a linear actuator that is coupled to a clevis, which is in turn coupled to a shaft. Activation of the actuator causes the clevis and therefore the shaft to rotate. Attached to each end of the shaft is a lift lever that extends rearwardly away from the shaft. The ends of the levers not attached to the shaft are equipped to be coupled to a support sling that is used to support the occupant and raise the occupant to a standing position. The vehicle is further equipped with a seat to accommodate the occupant in an initial seated position, and at any time that the occupant desires to be in a seated position. The vehicle of the invention also includes a hip support which is used to support the occupant in a stable, standing position and which may be adjusted vertically to enhance the support and comfort of the occupant.

Additional objects, advantages, and novel features of the invention will be set forth in part in the description which follows, and in part will become apparent to those skilled in the art upon examination of the following, or may be learned from practice of the invention.

BRIEF DESCRIPTION OF THE SEVERAL VIEWS OF THE DRAWING

In the accompanying drawings which form a part of the specification and are to be read in conjunction therewith and in which like reference numerals are used to indicate like parts in the various views:

FIG. 1 is a perspective view of an occupant-operated motorized vehicle according to the principles of the invention, with the lift levers in a lowered position and the sling attached thereto;

FIG. 2 is a side elevation view of the invention of FIG. 1, shown with an occupant in a seated position within the vehicle;

FIG. 3 is a side elevation view similar to FIG. 2, shown with the occupant in a standing position, with a portion of the seat shown in phantom in a partially raised position and with the hip support in a partially extended position;

FIG. 4 is a detailed partial cross-sectional view of the invention of FIG. 1, taken along line 4—4 of FIG. 3;

FIG. 5 is a detailed cross-sectional view of the invention of FIG. 1, taken along line 5—5 of FIG. 2;

FIG. 6 is a view similar to that of FIG. 5, taken along line 6—6 of FIG. 3, showing the hip support in a partially extended position;

FIG. 9 is a partial side elevation view of the invention, showing both an embodiment equipped with a seat, and an embodiment without a seat;

FIG. 10 is a partial, enlarged cross-sectional view of the seat of the invention of FIG. 1, showing the vertical adjustment of the seat;

FIG. 11 is a cross-sectional view of the bottom of the seat taken along 11—11 of FIG. 10;

FIG. 12 is a partial, enlarged cross-sectional view similar to FIG. 10, showing the horizontal adjustment of the seat; and FIG. 13 is a sectional view of the seat taken along line 13—13 of FIG. 11.

DETAILED DESCRIPTION OF THE INVENTION

Figure 7:
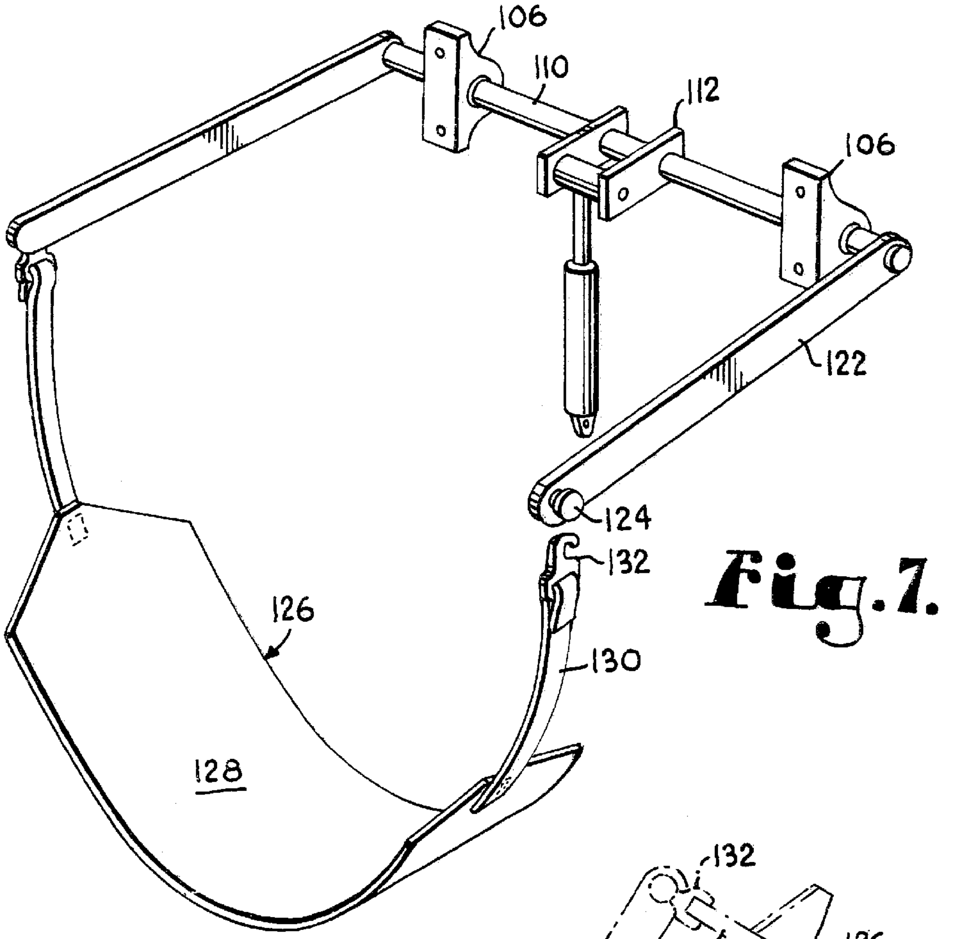
FIG. 7 is a view of the lifting structure of the invention of FIG. 1, showing elements of the lifting structure and their relation.

An occupant-operated motorized vehicle embodying the principals of this invention is broadly designated in the drawings by the reference numeral 10. With initial reference to FIG. 1, vehicle 10 includes a base 12 that rotatably supports a pair of front wheels 14. Vehicle 10 also includes a seat base 16 that rotatably supports a pair of rear wheels 18. Seat base 16 is removably coupled to base 12, as best seen in FIG. 9. Seat base 16 has a pair of extending, spaced apart and parallel coupling arms 20. Each coupling arm 20 has a pair of through holes 22 extending therethrough. Coupling arms 20 are inserted into a rear, square tubing section 24 of base 12. Tubing 24 has a pair of through holes 26 correspondingly spaced with through holes 22. As best seen in FIG. 4, bolts 28 are placed through through holes 22 and 26 to couple base 12 to seat base 16.

Each rear wheel 18 of seat base 16 is held within a caster 30 which is coupled to one end of a wheel support 32. Caster 30 supports wheel 18 so that it can freely rotate on a horizontal axis, and can also freely rotate or swivel about a vertical axis to accommodate turning vehicle 10, as is well-known in the art. The opposite end of wheel support 32 is fixedly attached to seat base 16, such as by welding. Wheel supports 32 are arched and are attached so that they extend rearwardly and upwardly away from seat base 16, thus providing rear wheels 18 with a support as well as the clearance necessary to allow wheels 18 to swivel completely about the vertical axis.

As best seen in FIG. 10, mounted approximately midway between each of the wheel supports 32 on seat base 16 is a seat assembly 34 that includes a ball drive pedestal actuator 36 mounted to seat base 16. An exemplary actuator is available from the Motion Systems Corporation of Eatontown, N.J., and has a motor 38 which operates to adjust an inner member 40 vertically up and down, as shown by the solid and phantom lines in FIG. 10, through the use of an inner ball drive. A protective flexible boot 42 surrounds actuator 36 to protect actuator 36 from dust and debris. Inner member 40 is coupled to a swivel bracket 44 which includes a lower portion 46 and an upper portion 48. Lower portion 46 is fixedly secured to inner member 40. Upper portion 48 is rotatingly coupled to lower portion 46. As best seen in FIGS. 11 and 13, extending outwardly from upper portion 48, and pivotally secured thereto, is a locking lever 50 which is used to secure a seat 52 is place. More specifically, lower portion 46 has a series of spaced apart locking spaces into which locking lever 50 is placed. When locking lever 50 is placed within the locking spaces, seat 52 is no longer free to rotate. Locking lever 50 may be pivoted away from lower portion 46 allowing seat 52 to be rotated, as shown by the arrows in FIG. 11. Locking lever 50 is biased by a spring 54 into a position within the locking spaces to prevent seat 52 from rotating when not desired.

As best seen in FIG. 11, upper portion 48 of swivel bracket 44 is rigidly coupled to a rectangular plate 56 which has secured thereto a pair of longitudinal, parallel rails 58. Rails 58 are slidingly disposed in a pair of longitudinal, parallel, u-shaped tracks 60 which are fixedly secured to the bottom of seat 52. Coupled to at least one of the tracks 60 is a linear actuator 62, which is operable by position switch 64. Position switch 64 activates actuator 62 when depressed so that seat 52 moves along tracks 60, allowing seat 52 to be adjusted forwardly or rearwardly, as shown by the solid and phantom lines in FIG. 12. Power for both actuator 36 and actuator 62 is supplied by a power source within vehicle 10, as is more fully described below. Seat 52 may be equipped with an optional seat back 66, as shown in phantom lines in FIG. 3.

If it is desired to operate vehicle 10 without seat base 16, seat base 16 may be removed from base 12. A pair of rear wheel supports 68, shown in FIG. 9, may be added upon removal of seat base 16. Each support 68 has a coupling arm 70 extending therefrom which has a pair of through holes 72 extending therethrough. Through holes 72 align with through holes 26 in base 12. Bolts 28 may be placed through through holes 26 and 72 to secure supports 68 to base 12. Supports 68 have rearwardly extending wheel supports 74 with swivel casters 76 secured thereto in similar fashion as described above for seat base 16.

As best seen in FIGS. 4 and 5, front wheels 14 are rotatingly secured to base 12 with gearbox shafts 78 and 80. Left wheel 14A is placed on shaft 78 and right wheel 14B is placed on shaft 80. Front wheels 14 are then secured against movement along shafts 78 and 80 by hubs 82. Each front wheel 14 is free to move independently of the other wheel 14. In other words, left wheel 14A is free to move in one direction while right wheel 14B is free to move in the opposite direction. The independent movement of front wheels 14 allows for increased maneuverability of vehicle 10, as is more fully discussed below.

Vehicle 10 is driven by motors 84 and 86, as best seen in FIG. 5. Motor 84 is coupled to a gear box 88, which has protruding therefrom shaft 78 for mounting of wheel 14A, as discussed above. Motor 86 is coupled with a corresponding gear box 90, which has protruding therefrom shaft 80 for mounting of wheel 14B, as discussed above. The rotational power generated by motor 84 is transmitted through gearbox 88 to shaft 78 and front wheel 14 mounted thereon. Correspondingly, the rotational power generated by motor 86 is transmitted through gear box 90 to shaft 80 and front wheel 14 mounted thereon. It can therefore be seen that front wheels 14 are free to move independently of one another, and that front wheel 14A could rotate in a different direction from front wheel 14B. Gear boxes 88 and 90 are mounted on a front support plate 92 that is in turn fixedly secured to base 12. Gearboxes 88 and 90 thus secure motors 84 and 86 respectively to vehicle 10 and also secure front wheels 14 to vehicle 10.

Immediately behind front support plate 92 and intermediate motors 84 and 86 and gear boxes 88 and 90 is housed a pair of batteries 94. Batteries 94 supply the necessary energy to drive and operate vehicle 10, including actuators 36 and 62. Batteries 94, motors 84 and 86 and gearboxes 88 and 90 are protected from debris by a lower cover 96.

Located behind gear boxes 88 and 90 is a vertical support frame 98 that extends from and is secured to base 12, such as by welding. Support frame 98 is equipped with an upper cover 100 that protects elements mounted thereto. Support frame 98 is preferably made of square steel bar supports 102 which are welded to a support plate 104. Other arrangements for support frame 98 could, of course, be used as long as they provide a rigid vertical structure for the mounting of equipment and support of the occupant, as further described below. A pair of bearing blocks 106 are secured to support plate 104 through a suitable attaching mechanism, such as bolts 108. Bearing blocks 106 support a lift shaft 110 that is inserted through the bearing surfaces of bearing blocks 106 so that lift shaft 110 is free to rotate within bearing blocks 106. A pair of collars may be secured to lift shaft 110 on either side of bearing blocks 106 to prevent lift shaft 110 from being axially displaced in bearing blocks 106.

Figure 8:
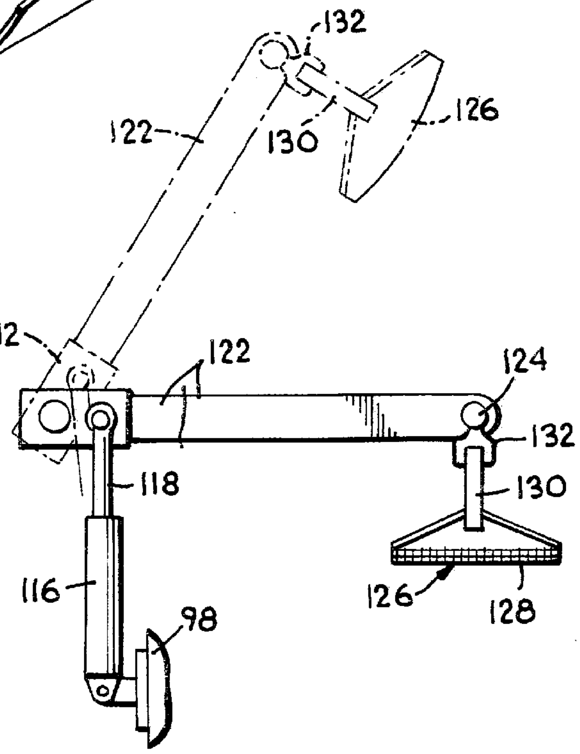
FIG. 8 is a detailed cross-sectional view taken along line 8—8 of FIG. 5, with the lifting structure shown in a raised position in phantom lines.

Coupled and extending outwardly from lift shaft 110 in the center thereof is a rectangular clevis 112 which may be attached to lift shaft 110 with any suitable means, such as by welding. As best seen in FIG. 7, on the end of clevis 112 distal from lift shaft 110 is a through hole 114 that is used to couple clevis 112 with a linear actuator 116. As best seen in FIG. 8, Linear actuator 116 is pivotally secured to clevis 112 and vertical support frame 98. More specifically, linear actuator 116 has an arm 118 extending therefrom with a mounting hole extending therethrough on its distal end. Arm 118 is coupled with clevis 112 by inserting a connecting rod 120 through the mounting hole and through hole 114. Therefore, extension of arm 118 will act upon clevis 112 and lift shaft 110 to cause lift shaft 110 to rotate within bearing blocks 106.

As best seen in FIG. 7, fixedly secured to each end of lift shaft 110 is a lift lever 122. Each lever 122 is secured to lift shaft 110 so that a rotation of lift shaft 110 results in a corresponding rotation of lift lever 122. This result can be achieved in any of the well known manners, such as by a key and key-way arrangement between lift shaft 110 and lift levers 122. Each lift lever 122 extends rearwardly toward seat 52 and has a length such that the end of lift lever 122 distal from lift shaft 110 generally coincides with the center of seat 52 when lift lever 122 is in a generally horizontal orientation. Extending outwardly from the distal end of lift lever 122 is a cylindrical protrusion 124. Protrusion 124 may either be integrally formed with lift lever 122 or may be attached thereto. As best seen in FIG. 7, preferably, protrusion 124 has a smaller diameter section located adjacent to lift lever 122 and a greater diameter section located in spaced relation to lever 122. Protrusions 124 are used to secure a sling 126 to lift levers 122. Sling 126 is preferably made of a fabric material and has a wider central section 128 and two outwardly extending support strips 130. Secured to each of the support strips 130 on the end thereof is a mounting hook 132 which can be used to couple sling 126 to protrusions 124, as best seen in FIG. 7.

As best seen in FIG. 6, secured to vertical support frame 98 on bar supports 102 are a pair of linear bearings 134 that slidingly receive and support a pair of extension shafts 136. Extension shafts 136 are free to move linearly within linear bearings 134, but are prohibited from moving beyond linear bearings 134 and are also generally prohibited from any transverse movement within bearings 134. The upper ends of extension shafts 136 are fixedly secured to a hip support frame 138. Hip support frame 138 is composed of a pair of end pieces 140 that are secured to a top plate 142 and a front plate 144. Secured to front plate 144 intermediate end pieces 140 is a support brace 146 that increases the structural integrity of hip support frame 138. As best seen in FIG. 3, coupled to, and extending rearwardly from, hip support frame 138 is a padded hip support 148 that will support the occupant in a standing position, as is more fully described below. Also fixedly attached to hip support frame 138 is a second linear actuator 150. Linear actuator 150 is equipped with an arm 152 that is extendable from and retractable within actuator 150 that can be used to raise and lower hip support frame 138 and thus hip support 148. Thus, when arm 152 is extended, hip support 148 will be raised, and when arm 152 is fully retracted, hip support 148 will be in its lowest position. In order to achieve this purpose, linear actuator 150 is fixedly secured to vertical support frame 98 with any suitable attaching means, such as by nut and bolt arrangement. Therefore, linear actuator 150 can be used to raise and lower hip support 148 in relation to vertical support frame 98, as may be needed to better support the occupant of vehicle 10 as well as to increase the comfort of the occupant.

As best seen in FIG. 5, attached to a top surface 154 of top plate 142 is a control device 156. Control device 156 is preferably a joystick type controller that can be used by the occupant of the vehicle to operate all aspects thereof. Control device 156 is used in cooperation with a power module 158 and an accessories module 160 to provide the control system which allows the occupant to control the vehicle. Control device 156 allows the occupant to control the lifting and lowering of sling 126, the raising and lowering of hip support 148, as well as the speed and direction of travel for vehicle 10. A preferred control system is the DX™ MODULAR MOBILITY SYSTEM available from Dynamic Controls, Ltd. of Christchurch, New Zealand. In this preferred embodiment, control device 156 is a DX-REM 41 DOLPHIN REMOTE™, power module 158 is preferably a DX-PM POWER Module™ and accessories module 160 is preferably a DX-Clam™ accessories module which are all available from Dynamic Controls, Ltd. of Christchurch, New Zealand. Control device 156, power module 158 and accessories module 160 allow the occupant of vehicle 10 to effect the operation thereof. Extending outwardly and rearwardly from support frame 138 is a padded leg divider 162, as can best be seen in FIG. 4, which acts to physically separate and partially support the occupant's legs when the occupant is in a standing position.

As can best be seen in FIGS. 1, 2 and 3, pivotally coupled to the upper end of support frame 98 is a padded upper body support 164. Upper body support 164 has a generally u-shaped frame 166, to which is coupled an upper body pad 168. Frame 166 is attached to support frame 98 with a ratchet coupling 170. Ratchet coupling 170 operates to lock support 164 in the desired position. As seen in FIG. 3, upper body support 164 is rotated to an extended position when the occupant is in a standing position. When the occupant is in a seated position, as shown in FIG. 2, upper body support 164 is rotated to rest against upper cover 100. Ratchet coupling 170 is equipped with a release lever 172, as shown in FIG. 1. Lever 172 acts to release a pawl from the ratchet teeth of coupling 170, thus allowing upper body support 164 to freely rotate. Rigidly secured to top surface 154 is a u-shaped rigid support handle 174, usable by the occupant for support when in a standing position.

In use, lift levers 122 will be in a raised position as best seen in FIG. 3, with sling 126 resting on seat 52 and with support strips 130 hanging downwardly therefrom. In this position, sling 126 is not attached to lift levers 122. The occupant desiring to use vehicle 10 thereafter approaches vehicle 10 and transfers himself to seat 52 so that he is resting on seat 52. Lift levers 122 are thereafter lowered by the occupant through the use of a joystick 176 on control device 156. After lift levers 122 have been sufficiently lowered, the occupant will attach sling 126 to lift levers 122 by attaching mounting hooks 132 over protrusions 124. The occupant is now in the position illustrated in FIG. 2. At this point, the occupant will operate control device 156 to raise lift levers 122. Control device 156 will therefore activate linear actuator 116 to extend arm 118 therefrom. As arm 118 extends from actuator 116, clevis 112 is rotated upwardly, as best seen in phantom lines in FIG. 8. Because clevis 112 is fixed to lift shaft 110, rotation of clevis 112 will result in a rotation of lift shaft 110. Further, because lift shaft 110 is secured to lift levers 122, rotation of shaft 110 will result in a rotation of lift levers 122. Therefore, as lift levers 122 are rotated upwardly, sling 126 will engage the occupant and effect a lifting motion thereon. Thus, the occupant is able to be transported to a standing position without the use of a great amount of upper body strength.

Depending on the size of the occupant, it may also be necessary for the occupant to raise hip support 148, which can also be controlled by control device 156. If it is desired to raise hip support 148, control device 156 can be used to activate linear actuator 150 so that arm 152 is extended therefrom. Arm 152 will act upon hip support frame 138 to cause it to be raised upwardly. Hip support 138 is supported in this upward movement by extension shafts 136 sliding within linear bearings 134. As can therefore be seen, vehicle 10 allows an occupant to adjust the hip support of the vehicle so that the occupant is both comfortable and supported in a stable, standing position. Control device 156 can thereafter be used to activate motors 84 and 86 to propel vehicle 10 forwardly and can also be used to steer vehicle 10.

From the foregoing, it will be seen that this invention is one well adapted to obtain all of the ends and objects hereinabove set forth together with other advantages which are obvious and which are inherent to the structure. It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. An occupant-operated vehicle for supporting and transporting an occupant along a traveling surface in a standing or sitting position, comprising:

a horizontally-oriented support platform having spaced front and rearward ends;

at least one pair of wheels supporting said platform above the traveling surface;

a frame coupled to said platform extending vertically upwardly from said platform;

a support sling pivotally coupled to said frame, said sling adapted to contact an occupant and adapted to support the weight of the occupant;

an actuator, coupled to said frame and said sling, said actuator adapted to operate to lift the occupant from a supported seated position to a standing position on said platform supported against said frame;

a hip support coupled to said frame;

means for vertically adjusting the height of the hip support which is adapted to be operable by the occupant; and means, coupled to at least one of said wheels and adapted to be operable by the occupant, for propelling the vehicle along the traveling surface.

2. The vehicle of claim 1, further comprising:

a lift shaft, rotatably coupled to said frame, said lift shaft having opposed terminal ends; and a first lift lever and a second lift lever, each having a shaft end fixedly coupled to one of said terminal ends of said lift shaft, and each having a coupling end distal from said shaft end and extending towards said rearward end of said platform, said support sling extending between said first and second lift levers and having a first end coupled to said coupling end of said first lift lever and having a second end coupled to said coupling end of said second lift lever.

3. The vehicle of claim 2, wherein said sling is removably coupled to said first and second lift levers.

4. The vehicle of claim 3, wherein said sling is flexible and is adapted to be formed to the shape of the occupant where said sling contacts said occupant.

5. The vehicle of claim 4, further comprising a seat coupled to said platform adjacent said rearward end between said rearward end and said frame and spaced above said platform, said seat adapted to support the occupant when the occupant is in a seated position.

6. The vehicle of claim 5, wherein said frame has a lower end coupled to said platform and an upper end distal from said lower end, wherein said hip support is coupled to said upper end of said frame, said hip support and said actuator adapted to cooperate to support the occupant in a fully standing position on said platform.

7. The vehicle of claim 6, further comprising a joy-stick controller coupled to said frame for controlling said propelling means, said actuator and said means for vertically adjusting the height of the hip support.

8. An occupant-operated vehicle for supporting and transporting a paraplegic occupant along a traveling surface in a standing or sitting position, comprising:

a horizontally-oriented support platform having spaced front and rearward ends;

at least one wheel rotatably coupled to said platform adjacent said front end and at least one wheel rotatably coupled to said platform adjacent said rearward end, said wheels supporting said platform above the traveling surface;

a frame coupled to said platform and extending vertically upwardly from said platform;

a seat coupled to said platform adjacent said rearward end between said rearward end and said frame and spaced above said platform, said seat adapted to support the occupant when the occupant is in a seated position;

a support sling pivotally coupled to said frame, said sling having an upper and a lower position, said sling extending over said seat when said sling is in said lower position, said sling adapted to contact the occupant and adapted to support the weight of the occupant;

an actuator, coupled to said frame and said sling, said actuator adapted to operate to move said sling from said lower position to said upper position to lift the occupant from a supported seated position to a standing position on said platform supported against said frame;

a padded upper body support coupled to said frame;

a padded hip support coupled to said frame; and means, coupled to at least one of said wheels and adapted to be operable by the occupant, for propelling the vehicle along the traveling surface.

9. The vehicle of claim 8, wherein said frame has a lower end coupled to said platform and an upper end distal from said lower end, wherein said hip support is coupled to said upper end of said frame, said hip support and said actuator adapted to cooperate to support the occupant in a fully standing position on said platform.

10. The vehicle of claim 9, further comprising means for vertically adjusting said hip support relative to said frame to accommodate occupants of differing size.

11. The vehicle of claim 10, further comprising:

a lift shaft, rotatably coupled to said frame, said lift shaft having opposed terminal ends; and a first lift lever and a second lift lever, each having a shaft end fixedly coupled to one of said terminal ends of said lift shaft, and each having a coupling end distal from said shaft end and extending towards said rearward end of said platform, said support sling extending between said first and second lift levers and having a first end coupled to said coupling end of said first lift lever and having a second end coupled to said coupling end of said second lift lever.

12. The vehicle of claim 11, further comprising a joy-stick controller coupled to said frame for controlling said propelling means, said actuator and said means for vertically adjusting the height of the hip support.

13. An occupant-operated vehicle for supporting and transporting an occupant along a traveling surface in a standing or sitting position, comprising:

a horizontally-oriented support platform having spaced front and rearward ends;

at least one pair of wheels supporting said platform above the traveling surface;

a frame coupled to said platform extending vertically upwardly from said platform;

means, adapted to be operable by the occupant; for lifting the occupant from a supported seated position to a standing position on said platform supported against said frame, said lifting means being coupled to said frame;

a hip support coupled to said frame;

means for vertically adjusting the height of the hip support which is adapted to be operable by the occupant;

a joy-stick controller coupled to said frame for controlling said propelling means, said actuator and said means for vertically adjusting the height of said hip support; and means, coupled to at least one of said wheels and adapted to be operable by the occupant, for propelling the vehicle along the traveling surface.

14. The vehicle of claim 13, wherein said lifting means comprises:

a lift shaft, rotatably coupled to said frame, said lift shaft having opposed terminal ends;

a first lift lever and a second lift lever, each having a shaft end fixedly coupled to one of said terminal ends of said lift shaft, and each having a coupling end distal from said shaft end and extending towards said rearward end of said platform;

a support sling extending between said first and second lift levers and having a first end coupled to said coupling end of said first lift lever and having a second end coupled to said coupling end of said second lift lever, said sling adapted to contact the occupant and adapted to support the weight of the occupant; and a means, adapted to be controllable by the occupant for rotating said lift shaft between a lowered position, wherein said sling and said first and second lift levers are adapted to support the occupant in a fully seated position, and a raised position, wherein said sling is adapted to support said occupant in a standing position on said platform.

15. The vehicle of claim 14, wherein said sling is removably coupled to said first and second lift levers.

16. The vehicle of claim 15, wherein said sling is flexible and is adapted to be formed to the shape of the occupant where said sling contacts said occupant.

17. The vehicle of claim 16, further comprising a seat coupled to said platform adjacent said rearward end between said rearward end and said frame and spaced above said platform, said seat adapted to support the occupant when the occupant is in a seated position.

18. The vehicle of claim 17, wherein said frame has a lower end coupled to said base and an upper end distal from said lower end, wherein said hip support is coupled to said upper end of said frame, said hip support and said lifting means adapted to cooperate to support the occupant in a fully standing position on said platform.

19. The vehicle of claim 18, further comprising means for vertically adjusting the hip support which are adapted to be operable by the occupant.

* * * * *